March 5, 1940.  C. U. BALLARD  2,192,175

HYDRAULIC STEERING AND CONTROL DEVICE

Filed Sept. 17, 1935  4 Sheets-Sheet 1

Inventor
Charles U. Ballard
by Hazard and Miller
Attorneys.

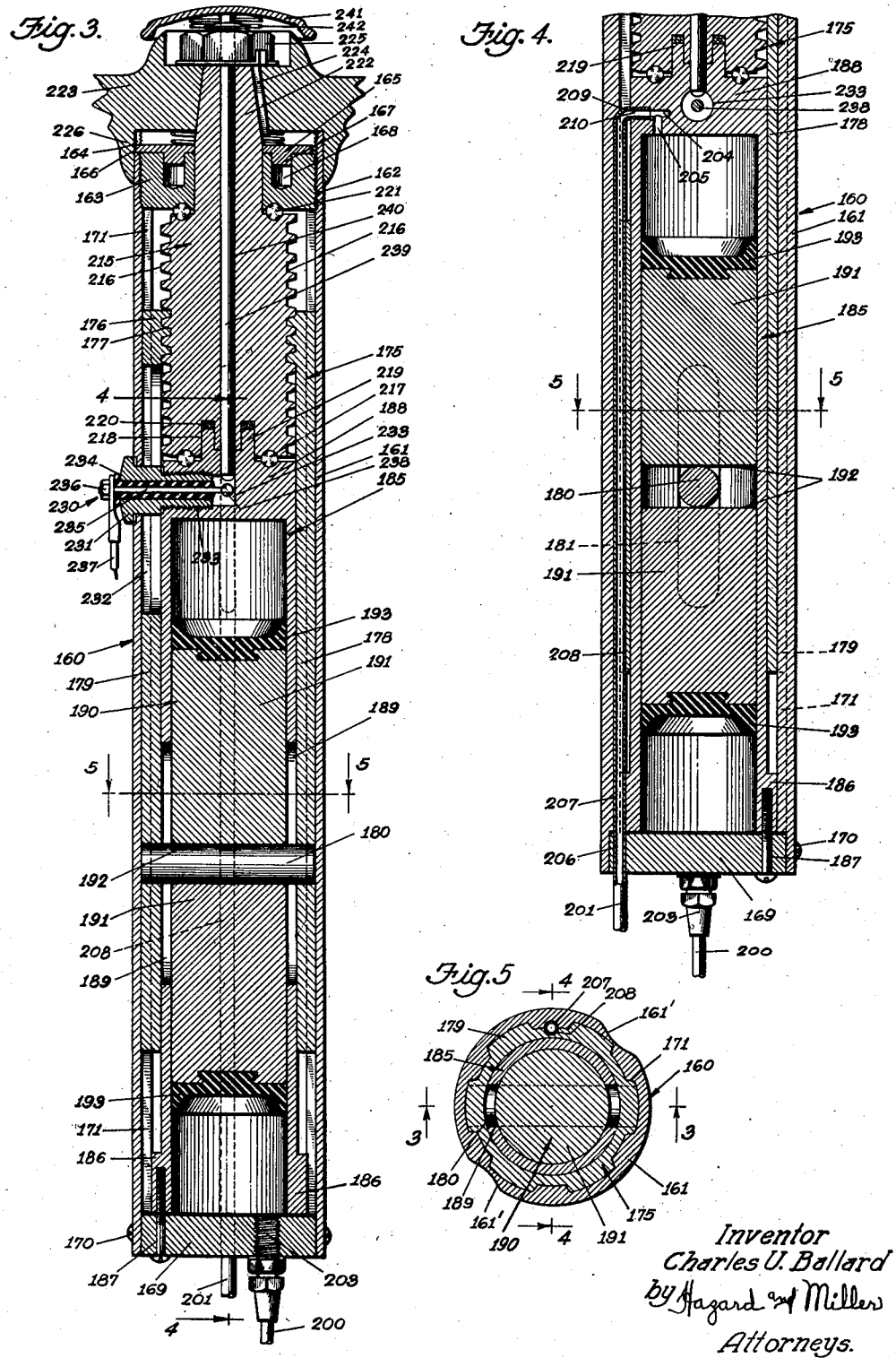

March 5, 1940. C. U. BALLARD 2,192,175
HYDRAULIC STEERING AND CONTROL DEVICE
Filed Sept 17, 1935 4 Sheets-Sheet 3
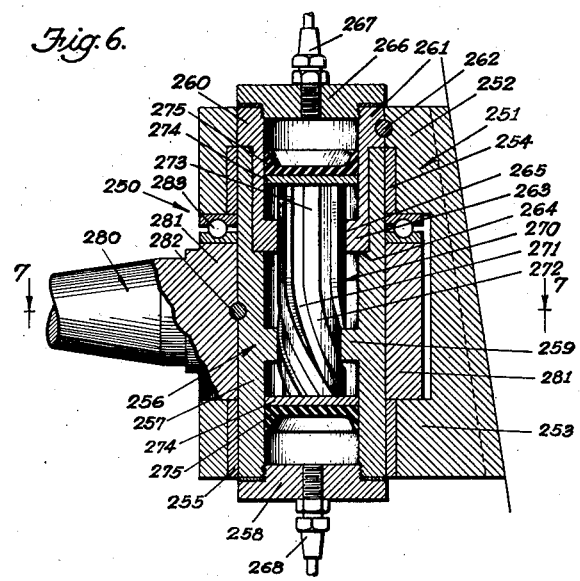
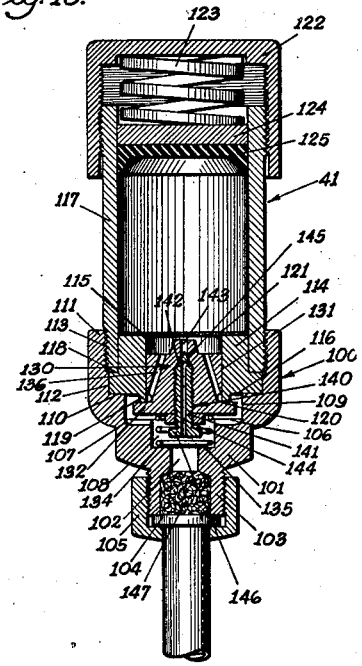
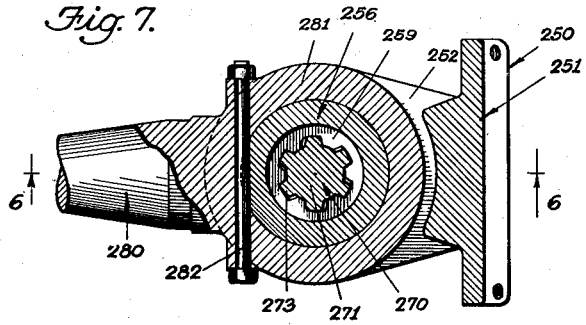
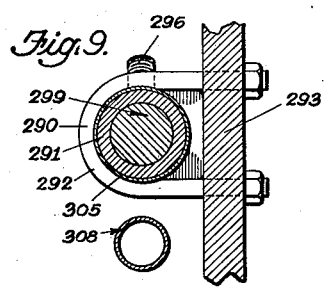
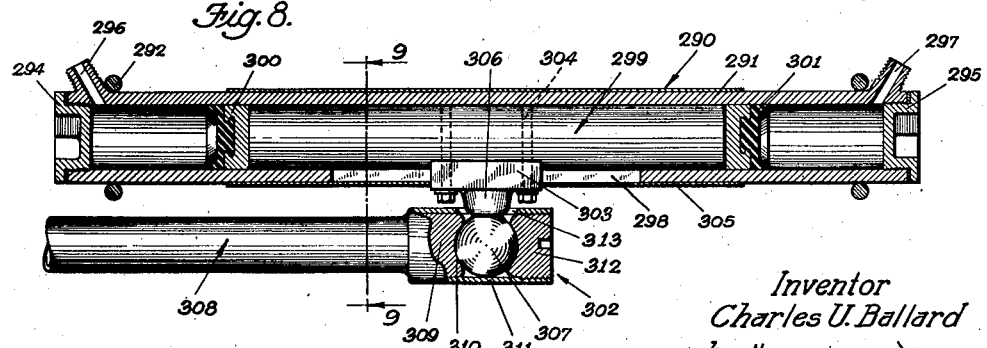
Inventor
Charles U. Ballard
by Hazard and Miller
Attorneys.

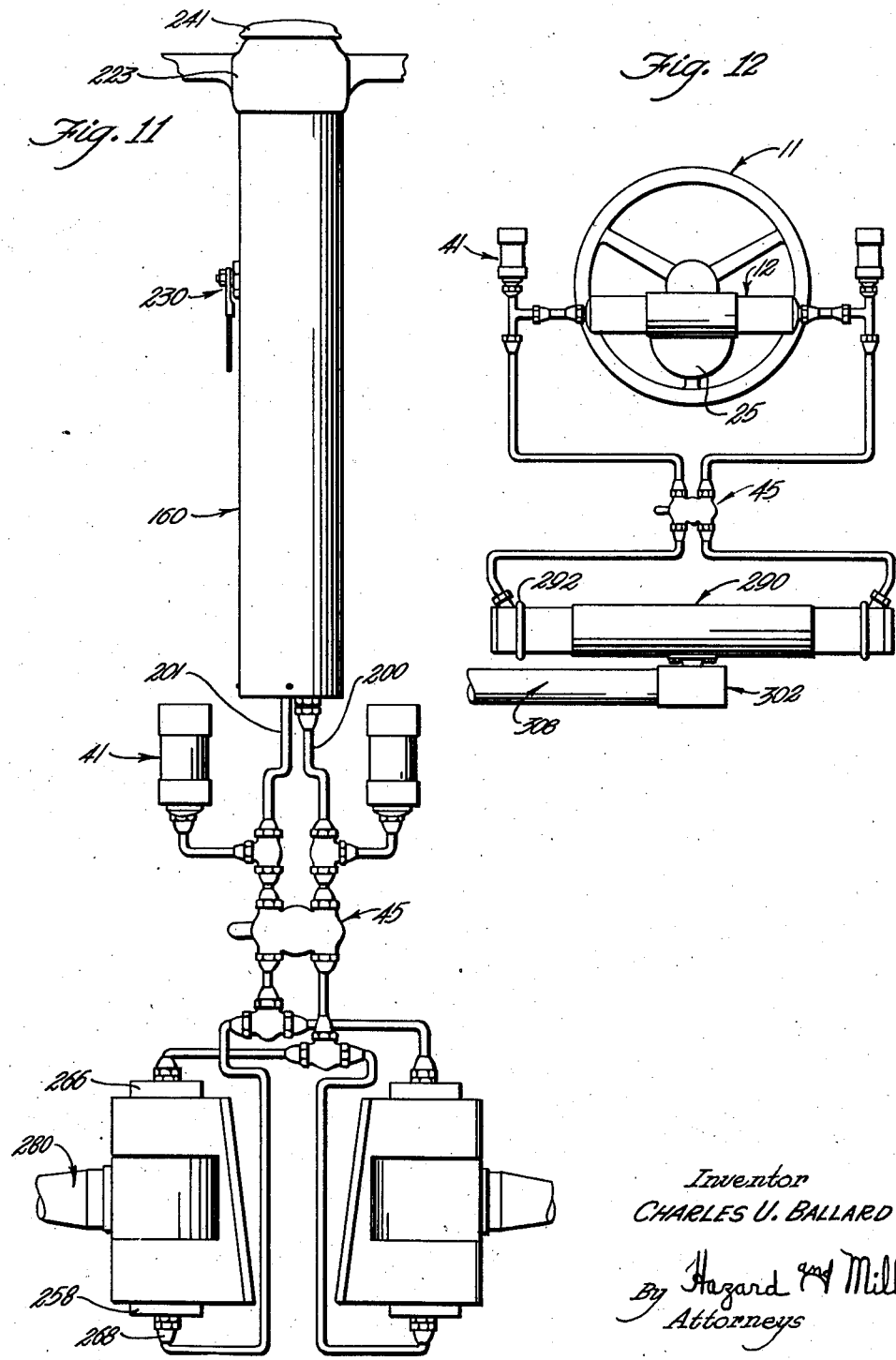

Patented Mar. 5, 1940

2,192,175

UNITED STATES PATENT OFFICE 2,192,175

HYDRAULIC STEERING AND CONTROL DEVICE

Charles U. Ballard, Inglewood, Calif.

Application September 17, 1935, Serial No. 40,912

4 Claims. (Cl. 60—54.5)

My invention applies in a somewhat broad field to a hydraulic compressor and actuators by which the movement of the fluid developed in the compressor is used to actuate devices in an angular turning movement. Thus, my invention may be used for steering, as in the steering of vehicles, operating the rudder of vessels, or, for instance, in airplanes for either actuating the rudder, elevator, and the ailerons. Therefore, by a suitable setup the rudder, the elevator, and the ailerons of an airplane may be suitably actuated hydraulically.

Another object and feature of my invention is using somewhat the same type of mechanism in both the compressor for generating the pressure in the fluid and in the actuator by which the fluid under pressure is applied to a useful purpose in developing the angular motion. Thus, in my invention I may have in the compressor a double ended piston which may be reciprocated, for instance, by gears or by a screw type of mechanism to create a positive pressure at one end of the cylinder and the same type of mechanism operating in the reverse manner may be used in the actuator. Thus, the actuators being provided with double ended pistons when moved by the hydraulic fluid under pressure through gears or a screw connection may operate the device to be rotated in an arc.

Another object and feature of my invention is in constructing both the compressors and the actuators in such a manner that they are practically leakproof, having no operating parts extending through a casing or the like subject to pressure. Hence, no stuffing boxes or the equivalent are required in the mechanism which gives motion to the double ended piston in the compressor nor stuffing boxes or such equipment necessary in the actuator for turning the element which has an angular movement in reference to the movement in reciprocating the double ended piston.

A further general object and feature of my invention is in the compressors employing a cylinder in which operates a double ended piston, each end of the cylinder being connected to a hydraulic pipe line and providing in each pipe line a compensating relief valve, such valve being designed and constructed to permit the outlet flow of fluid from the hydraulic system when the fluid in the hydraulic system expands through heat, and therefore must have an outlet for the excess fluid. This relief valve is also constructed and designed to supply fluid to replace a deficiency in the system and thus has a double function in relieving the fluid under excess pressure in the system and again replacing and supplying fluid to the system to assure there is a sufficient quantity for operating mechanism under all circumstances. The relief valve may be set to release fluid under a predetermined pressure but this release is at a very slow rate in order to take care of the expansion of the fluid but not to allow fluid to be forced outwardly through the relief valve due to the operation of the compressor. Thus, the operation of the compressor substantially closes the relief valve and confines the operating fluid to the hydraulic system but when the fluid expands through heat and in the intermittent periods between operation of the compressor this excess fluid may escape.

A feature of my invention in one type of mechanism is the employment of a cylinder having a double ended piston connected by a rack. This rack is actuated by a system of gears, the initial movement being by a rotatable steering wheel. From each end of the cylinder hydraulic pipes lead to the actuator. Such actuator has a cylinder with a double ended piston, the piston having a rack and in the movement of the piston the rack meshes with a segmental gear and thus causes the rotation either of the device connected to the segmental gear or if this gear should be held stationary, to the piston having the rack and thus the cylinders in which the piston is mounted.

In another form of my invention the double ended piston is arranged to operate in a cylinder and be reciprocated by a screw and nut of which either the screw or nut may be rotatable and, for instance, when using a screw this may be turned by a steering wheel, thus causing a longitudinal movement of the nut, the nut having splines or the like to prevent its rotation relative to the cylinder, and such nut is provided with a sleeve connected by pins or the like to the piston, thus causing a reciprocation in opposite directions of the piston and developing hydraulic pressure at either end of the cylinder from both ends of which the supply pipes lead to the actuator.

The screw type of actuator may be of a reverse character and, for instance, the double ended piston may have a screw and splines to prevent rotation of the screw, the splines operating through a relatively fixed structure, and the screw portion engaging a nut forming part of the cylinder. Therefore under the operation of the fluid from the compressor as the piston is moved in one direction the nut and, hence, the cylinder, will be caused to rotate and this rotation may be communicated to the part to be moved, such as the steering axle of a vehicle wheel or the rudder post of a vessel or the like. In this type of device the action may be the reverse; the cylinder may be held stationary and have the splines operate the turning part of the mechanism.

Another object and feature of my invention is the development of a simplified double acting piston which may be connected directly to a drag link for operating a steering mechanism. In this case the piston operates in a cylinder, the cylinder being provided with a slot on one side through which extends a swivel connection for the drag link. Thus, this connection may be substantially at the center of the double ended piston.

Another feature of my invention involves a locking valve between the compressor and the actuators, such valve being connected across the two pressure pipes from the compressor cylinder to the actuator, such being a two-way valve, and such valve when in the closed position gives a connection from one end of the compressor to one end of the actuator and from the other end of the compressor to the other end of the actuator. When the valve is turned to its open position it affords a free connection between both ends of the compressor and also between both ends of the actuator cylinder. This allows the steering wheel to be rotated in either direction, giving a movement of the liquid between both ends of the compressor but on account of the friction resistance of the gears or of a connection the actuator pistons cannot be readily operated to circulate the fluid between the two ends of the actuator cylinder and thus for practical purposes the actuator is locked in its fixed position when the valve forms an open connection between both ends of the actuator cylinder. However, where the friction in the actuator is comparatively low and the valve is in the open position, the oscillating device of the actuators may be readily moved.

Another feature of my invention is the employment of loose pistons engaging opposite ends of the piston rods, which construction allows pressure to be applied in one direction against the packing of the pistons and eliminates the drawing of air into the hydraulic system which frequently happens where a piston is moved in a suction stroke.

My invention is illustrated in the accompanying drawings, in which:

Fig. 1 is a schematic view of one type of a compressor and a similar type of actuator. In this case both have double ended pistons with a rack, the rack meshing with the pinions. This figure shows longitudinal sections through the compressor cylinder and the actuator cylinder and shows a section through the locking valve, the relief valve being in elevation.

Fig. 3 is a longitudinal section taken on the line 3—3 of Fig. 5, with the piston pin shown in elevation, through another form of compressor, this being a rotatable screw type.

Fig. 4 is a partial longitudinal section taken on the line 4—4 of Fig. 5 in the direction of the arrows to show the pressure pipe connected to the upper head of the cylinder.

Fig. 5 is a transverse section on the line 5—5 of Figs. 3 or 4 taken in the direction of the arrows.

Fig. 6 is a longitudinal section on the line 6—6 of Fig. 7 in the direction of the arrows through a screw operated actuator, the screw forming part of the double headed piston and having splines formed integral with the screw.

Fig. 7 is a transverse section on the line 7—7 of Fig. 6, taken in the direction of the arrows.

Fig. 8 is a longitudinal section through another form of actuator, this having a double ended piston connected to a drag link of a steering mechanism, the connection being through a slot in the cylinder.

Fig. 9 is a transverse section on the line 9—9 of Fig. 8 in the direction of the arrows, illustrating the manner of clamping the cylinder to a fixed structure.

Fig. 10 is a longitudinal section through the combination pressure relief valve and auxiliary supply reservoir and valve.

Fig. 11 is an assembly drawing showing the connections of the compressor of Figs. 3, 4 and 5 with the actuator units of Figs. 6 and 7, such illustration being somewhat in diagram to conform with Fig. 1.

Fig. 12 is an assembly drawing of a compressor with the actuator unit of Figs. 8 and 9, this likewise being somewhat diagrammatic to conform to Fig. 1.

Figure 1:
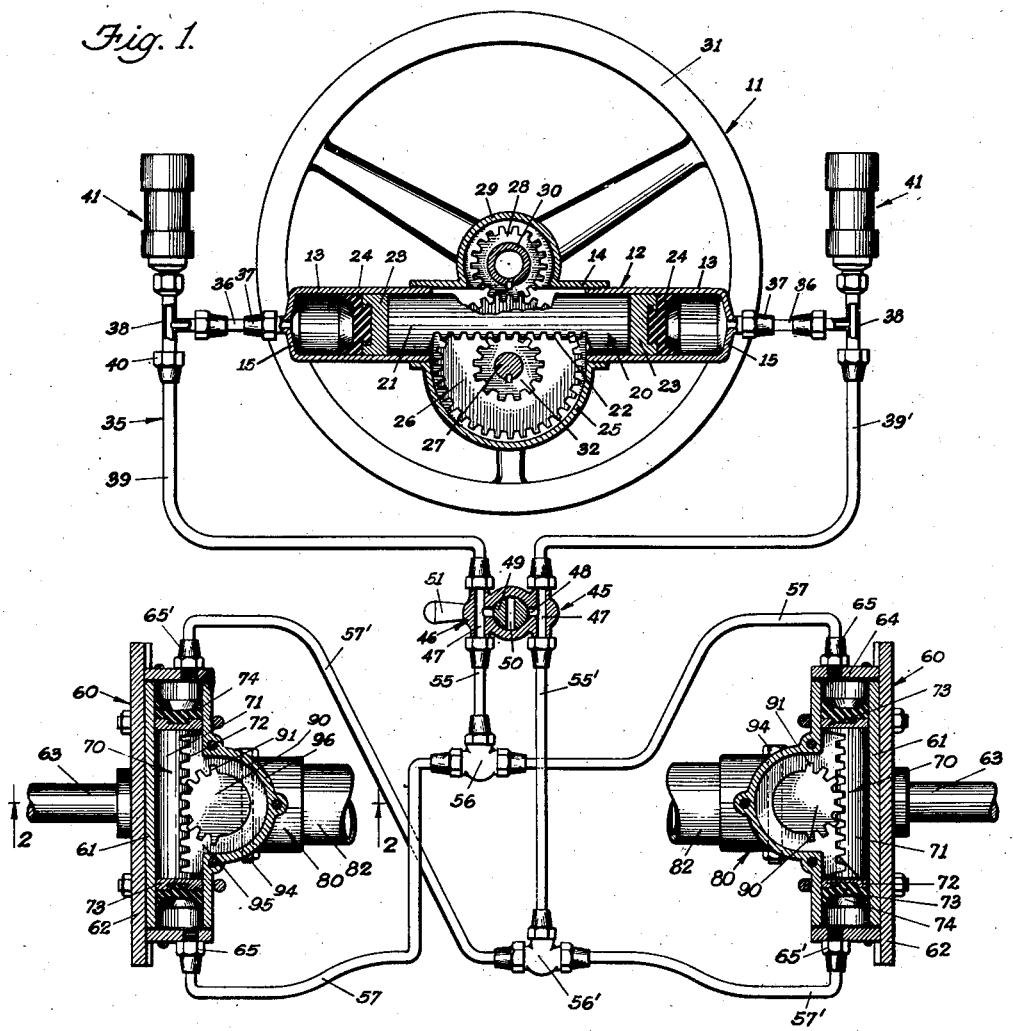
Figure 2:
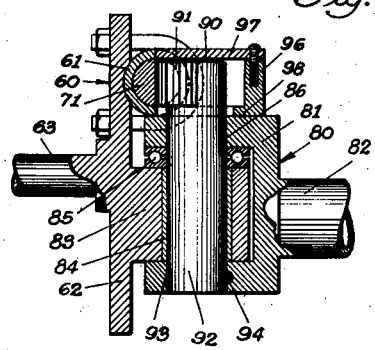
Fig. 2 is a detailed section on the line 2—2 of Fig. 1 in the direction of the arrows.

Referring first to the construction of Figs. 1 and 2. In this case the compressor assembly designated by the numeral 11 employs a cylinder 12. This is formed of two similar ends 13 connected to a hollow supporting structure 14, the cylinder having heads 15.

The double ended piston designated by the assembly numeral 20 has a piston rod 21 which forms a rack bar having rack teeth 22 thereon. Loose piston heads 23 contact the end of the rod and secured to each head there is a piston cup 24, this being attached to the head by a dove-tailed connection, the coupling preferably formed of rubber or the like. The hollow structure 14 has an enlargement 25 on one side accommodating a large driven gear 26 keyed to a shaft 27. This gear is operated by a driving gear 28 housed in an enlargement 29 of the hollow structure 14 on the opposite side of the cylinder. The gear 28 is connected to the rotatable steering post 30 actuated by the steering wheel 31. A pinion 32 is keyed to the shaft 27 and meshes with the rack 22, thus the rotation of the steering wheel 31 rotates the driving gear 28 which in turn causes a rotation of the driven gear 26, the shaft 27, the pinion 32, and a reciprocating motion to the piston rod which also forms a connecting rack bar.

Each of the cylinder heads is connected to a pressure pipe line 35, this being illustrated as having nipples 36 with connectors 37, a T 38, a main pipe 39 and 39' connected to one end of the T by a coupling 40. To the other end of the T there is connected a combination pressure relief valve and supply reservoir designated by the assembly numeral 41.

The main pressure pipes 39 and 39' are connected to a lockoff valve 45. This has a housing 46 with two ducts 47 therethrough and a transverse duct 48. The rotatable stem 49 of the valve has a transverse port 50, this stem being actuated by a handle 51. The pipes 39 are connected to one side of the housing and on the opposite side there is a continuation of the supply pipes designated 55 and 55'. Each of these is attached to a T coupling unit 56 and 56', from which extend pressure pipes 57 and 57' to the actuator.

The actuator as illustrated in Figs. 1 and 2 is identified by the assembly numeral 60 and employs a cylinder 61 clamped to the structure 62 which is to be turned. This is illustrated as having a spindle or rod 63 which is to be rotated through an arc. The cylinder has closed heads 64 with connections 65 and 65' to the pressure pipes 57 and 57', respectively. In the cylinder there is the double ended piston designated by the assembly numeral 70, this having a piston rod 71 with rack teeth 72 thereon. Loose heads 73 engage the end of the piston rod. These heads support the piston cups 74, the cups being secured to the heads by dovetailing or in any suitable manner.

A fixed supporting structure 80 is shown as having a yoke-shaped bearing block 81. This may be connected, for instance, to a fixed axle 82, or other similar structure, and forms a journal for the turning structure 62, this being illustrated as having a hub 83 (note Fig. 2), with a bushing 84. An anti-thrust bearing 85 is used between the hub 83 and the upper end 86 of the yoke 81 where the device is used, for instance, for a steering wheel of a vehicle.

A segmental pinion 90 has pinion teeth 91 on its upper end. This pinion has a rod or shaft 92 extending through openings 93 in the ends of the yoke 81 and is secured from rotation by a key or pin 94. Thus, the pinion is held stationary as regards the fixed structure 80. The cylinder 61 has an opening 95 in one side with a hollow housing 96 connected thereto, this being provided with a cover cap 97. The housing has a base 98 which may have a rotational bearing on the outer end of the upper yoke 86. This housing accommodates the segmental pinion 90 having the pinion teeth 91.

The manner of operating the assembly of Figs. 1 and 2 is substantially as follows:

When the steering wheel is rotated in one direction or the other a movement is given to the double ended piston toward one end of the cylinder 13, thus exerting a pressure on the fluid at one end. This travels through the pipes 39 or 39' and when the valve 45 is in the closed position illustrated fluid is carried through the pipes 57 and 57' to opposite ends of the cylinder in the actuator and causes a movement of the doubled ended piston relative to the cylinder. Then, on account of the segmental pinion 90 being held stationary and there being a relative movement between the rack and the pinion the cylinder is caused to rotate a partial turn around the axis of a pinion as the center of rotation, thus moving the spindle or rod 63. The valve 45 may be opened by aligning the port 50 with the transverse ducts 48, in which case when the compressor is operated the fluid has a free flow through the pipes 39, the ducts 47, 48, and the port 50 on the plug 49 between the ends of the cylinder. There is also a free passage for the fluid at opposite ends of the actuator by means of the pipes 57, 57', 55 and 55', through the same ducts and ports of the valve 45, but on account of the low frictional resistance to the movement of the piston by turning the rod or spindle 63, such spindle is movable from the position occupied when the valve is turned to its open position.

The lock out valve 45 is illustrated in Fig. 1 in the position designated as closed, that is, the transverse port 50 in the rotatable stem 49 is out of registry with the transverse by-pass ducts 48. This gives a direct communication between one end of the compressor cylinder and one end of the actuator cylinders. It also affords direct connection from the opposite end of the compressor to the opposite ends of the actuator cylinders, however when the valve is in its open position affording a through connection by the by-pass 48 and the port 50, there is a free communication between the opposite ends of all of the cylinders.

The combined pressure relief valve and supply reservoir 41 is constructed as follows, having reference particularly to Fig. 10:

This employs a valve housing 100 which has a base 101 with an opening 102 therethrough, a threaded neck 103, to which may be connected the head 104 on the upper end of the T connection 38, this being clamped by a coupling nut 105. The base has a lower flat valve seat 106 with a groove 107, there being a central recess 108. A cylindrical bore 109 of larger diameter than the recess extends upwardly from the seat 106 and above this there is a shoulder 110. The flange 111 has a cylindrical inside surface 112 immediately above the shoulder 110 and an internal screw thread 113. A ring 114 has a cylindrical bore 115 and it is provided with a lower surface 116 seating on the shoulder 110 and is held in place by a cylinder 117 threaded into the threads 113 and engaging the shoulder 118 of the ring. The ring has a downwardly projecting rim 119, the lower edge 120 of which forms an upper valve seat. A screen 121 rests on the upper end of the ring 114.

An adjusting pressure cap 122 is threaded on the upper end of the cylinder 117 and has a seat for a compression spring 123 bearing on the disk piston 124, this being backed by a piston cup 125. The slidable valve plug designated by the assembly numeral 130 has a cylindrical surface 131 sliding inside of the bore 115 of the ring 114 and has a flange 132 and a lower surface. A compression spring 134 seats on the shoulder 135 of the base 101 and normally holds the valve plug seated on the upper valve seat, that is, the upper surface of the flange 132 engages the seat on the rim 119.

Main ports 136 lead upwardly through the valve plug from above the rim to the upper surface of the plug, thus communicating with the cylinder 117. An adjustable needle valve construction designated by the assembly numeral 140 employs a threaded stem 141 in a bore in the plug, this bore having a conical valve seat 142 and a port 143 at the top of the plug. The stem of the plug has a fine bore 144, the end of which 145 leads to the conical seat 142. The stem has a head 146 for adjustment. A loose straining packing 147 is confined by the coupling nut 105 in the lower part of the base 101.

The operation and functioning of this relief valve and supply reservoir shown in detail in Fig. 10 and described above is as follows: In the normal operation of the device the needle valve is adjusted so that when the fluid in the compressor and actuator system expands from heat, the excess fluid may slowly pass through the small bore of the stem and the plug 130 and be admitted to the cylinder 117, causing an upward movement of the pistons 124 and 125 compressing the spring 123. In this normal operation the valve plug is held seated by the spring 135. In addition the excess pressure developed by the operation of the compressor also forces the valve plug 130 upwardly by pressure on the lower face 133 and maintains this plug seated so that the fluid under pressure of the compressor cannot pass through the ports 136. Should there be a deficiency of fluid in the system including the compressors, the actuators and the piping connected therebetween, the spring 123 forces the piston plugs 124 and 125 downwardly, thus causing an unseating of the valve plug 130 from its upper seat and forcing this downwardly on the lower seat 106. There may then be a downward flow of supply liquid through the ports 136 and the grooves 107 to the piping system connecting the compressors and the actuators and thus at all times maintaining these properly filled with hydraulic fluid. It will thus be seen that the valve assembly 41 takes care of the expansion of the fluid in the system and also the supply from a reservoir to make up a deficiency of fluid in the system.

It is to be noted that the needle valve of Fig. 10 designated by the assembly numeral 140 which is manually adjustable is always open and thus may always transmit fluid between the reservoir and the compressor and thus into the pipe of the compressor and actuator systems or vice versa. The flow of course is regulated to be only at a very slow rate such as drop by drop and thus the direction of flow is dependent on the differential pressures between the reservoir and the compressor and the piping connecting between the compressor and the reservoir assembly.

I use other types of compressors and actuators than those illustrated in connection with Figs. 1 and 2. Another type of compressor is shown in Figs. 3, 4 and 5 and designated generally by the assembly numeral 160. This employs an outer shell 161 which may by clamps or other suitable devices be held stationary; there being provided longitudinal grooves 161' for this purpose. This shell is internally threaded at the upper end 162 and has a closure plug 163 threaded therein. The upper end of the shell is castellated as indicated at 164 by having notches cut therein and a nonrotatable ring 165 has lateral projections 166 which fit in the notches 164. This ring has downwardly projecting bosses 167 engaging recesses 168 in the plug 163. The opposite end of the shell has a closure head 169 fitted in the end of the shell and secured thereto by radial screws 170. The shell is provided with longitudinal internal wide grooves 171 for a purpose hereinunder detailed. These splines preferably extend from the plug 163 to the closure head 169.

A combined nut and sleeve designated 175 is slidably mounted in the shell and has a nut end 176 with internal threads 177. A sleeve section 178 extends downwardly from the nut inside of the shell and has external wide splines 179 engaging and guided in the longitudinal wide grooves 171 in the inside of the shell. A piston pin 180 is connected diametrically across the sleeve portion 178, the ends of the pin being confined by the inside of the shell 161.

A fixed cylinder 185 has its lower end 186 secured to the head 169 of the shell by longitudinally extending bolts 187, thus confining the cylinder stationary. Such cylinder has a closure head 188 at the opposite end. The cylinder has diametrically opposite longitudinal slots 189 to accommodate the lengthwise travel of the piston pin 180, such pin being moved longitudinally by the combination nut and sleeve designated above by the assembly numeral 175, this being reciprocated in the manner hereinunder detailed. The piston assembly 190 has two separate piston plugs 191, each adapted at its inner end 192 to contact the piston pin 180. The opposite ends of each piston plug have resilient piston cups 193 secured in place by dove-tailing or the like.

The oil circulation is provided by pipes 200 and 201, the pipe 200 being illustrated as connected to a nipple 203 in the closure head 169 at the lower end of the sleeve. The upper head 188 of the cylinder has a transverse bore 204 and a longitudinal port 205 leading to the head of the cylinder. The pipe 201 leads through a perforation 206 in the lower head 169 and fits in longitudinal grooves 207 on the inside of the shell 161 and a complementary groove 208 in the outside of the sleeve portion 178 of the combination nut and sleeve assembly 175. The pipe has a bent end 209, the end portion 210 being threaded in the bore 204. Thus there is a hydraulic fluid connection between both ends of the cylinder and the double ended piston. The rotatable structure for reciprocating the nut and sleeve assembly 175 is as follows, and includes a rotatable screw 215 having external threads 216 engaging the threads 176. This has an anti-friction bearing connection 217 with the cylinder head 188. The lower end of the screw 215 is provided with an annular recess 218 in which fits the annular projection 219 on the head 188; the packing ring 220 being used to obtain a seal. The opposite end of the screw 215 has an anti-friction bearing 221 engaging the underside of the closure plug 163, this being held from rotation in the sleeve by the washer 165. An operating stem 222 extends through the head 163 and has a steering wheel 223 or the like secured thereto by a key 224 or the like. A nut 225 is threaded on the end of the stem and firmly holds the steering wheel in place, which wheel may have a flange 226 extending over the outside of the shell 161 at the top.

The manner of operation and functioning of the compressor of Figs. 3, 4 and 5 so far described, is as follows:

On account of the shell 161 being held in a stationary position, the hand steering wheel or operating wheel 123 may be rotated, which in its turn rotates the screw 215. This causes either an upward or a downward movement of the combined nut and sleeve 175, the nut 176 having a threaded connection with the screw. This gives either an up or down or reciprocating motion to the piston pin 180. The cylinder 185 as above described is held stationary, therefore the movement of the pin 180 in either direction forces one or other of the piston plugs 191 of the piston assembly towards one of the cylinder heads, thus compressing the fluid at one end of the cylinder and forcing it through either of the pipes 200 or 201. Fluid from the pipe system and the actuators then flows in through the opposite pipe, filling the opposite end of the cylinder to that to which the fluid is under pressure and maintains the opposite piston plug 191 in contact with the piston pin 180. It will thus be seen that a positive hydraulic pressure may be developed at either end of the cylinder 185.

As it is convenient to have a horn operating switch in the steering column, this is mounted as follows, having reference to Fig. 3, the assembly being designated by the assembly numeral 230: This employs a tubular plug 231 which leads through the sleeve 161 through a slot 232 formed at the sleeve 178 and is threaded into the head 188 at the upper end of the cylinder 185, this head having a bore 233. An insulating bushing 234 is fitted in the plug 231 and has an electrical conducting rod 235 fitted therein connecting at the outside to a terminal 236 from which there is an electric lead 237. The inner end of this rod has a contact knob 238. A complementary contact plunger or rod 239 leads through a longitudinal bore 240 in the screw 215 and the stem 222, this having a pusher knob 241 above the steering wheel and normally held in an elevated position by the compression spring 242 which bears on the nut 225 and on the underside of the knob. Therefore when the knob 241 is pressed downwardly it forms a conducting contact between the lower end of the stem or rod 239 and the contact end 238; thus forming a ground connection which may be in circuit with a horn or other signalling device.

The actuator of Figs. 6 and 7 is constructed as follows, and designated by the assembly numeral 250: This employs a fixed structure 251 which may be secured to any suitable fixed part of a vehicle such as an automobile, an airplane or a vessel. This fixed structure is illustrated as having an upper hub 252 and a lower hub 253. The upper hub is provided with a bushing 254 and the lower hub with a bushing 255.

A compound cylinder designated by the assembly numeral 256 is fitted in the bore of the fixed structure 251. This has a lower rotatable part 257 rotating in the bushing 254 and 255 and has a closure head 258 at its lower end. This cylinder is provided with an internally threaded nut 259 formed integral therewith. The upper end of the cylinder 260 has an enlargement 261 at its upper end secured by a key 262 to the upper hub 252 and is hence non-rotatable. An internal enlargement 263 at the bottom engages the shoulder 264 on the movable part of the cylinder assembly 257 and has splines 265. A closure head 266 is threaded or otherwise attached to the upper stationary part of the cylinder 260. There are connector pipes 267 connected to the head 266 and 268 connected to the head 258.

The piston designated by the assembly numeral 270 has a piston rod 271, the lower portion of which has screw threads 272 engaging with the threads of the nut 259 on the lower or rotatable part of the cylinder 257 and has longitudinal splines 273 on its upper portion engaging the splines 265 on the enlargement 263 of the fixed part 260 of the cylinder 256. Pistons 274 having the piston cups 275 are loosely fitted in their respective portions of the cylinder and adapted to contact the end of the combination screw and spline piston or piston rod.

A movable steering stem spindle or axle 280 has a hub structure 281 surrounding the rotatable portion 257 of the cylinder 256 and secured thereto by a key 282 or other suitable fastening. Preferably anti-friction bearings 283 are located between the upper end of the hub 281 and the upper hub 252 of the fixed structure.

The manner of operation and functioning of the actuator of Figs. 6 and 7 is as follows: When hydraulic pressure is developed in either the upper or the lower end of the combination cylinder made up of the stationary movable part 257 and the stationary part 26 through the medium of hydraulic fluid flowing through either of the pipes 267 or 268, the pressure on the piston cups and pistons forces the combination spline and threaded piston rod 270 either upwardly or downwardly. As this is held from rotation by means of the spline connection at 263, the nut portion 259 of the rotatable part of the cylinder is given a rotation in either one direction or the other on the axis of the piston rod and of the combination cylinder. This develops an angular movement of the spindle 280 which may be used for instance for steering the wheels of a vehicle, the rudder of a vessel or the elevator of an airplane, or two of them working in opposite directions may be used to operate the ailerons of an airplane. This type of actuator is used with the connecting closure and control valve 45 of Fig. 1 and the combination reservoir and relief valve 41 shown and described in connection with Fig. 1.

The type of actuator shown in Figs. 8 and 9 and designated by the assembly numeral 290, employs a substantial cylinder 291 which may be secured by a clamp 292 to a fixed structure 293. This cylinder has closure heads 294 and 295 at its opposite ends and connections 296 and 297 for the hydraulic pipes from the compressor. The cylinder 291 has a longitudinal slot 298. A plug piston rod 299 is mounted to reciprocate in the cylinder and contacting the ends of this rod there are pistons 300 having piston cups 301 attached thereto.

A swivel connection designated by the numeral 302 employs a block 303 secured by screws 304 or the like to the piston rod 299. This block extends through the slot 298 in the cylinder and has a slidable cover sleeve 305 connected thereto, which forms a cover for the slot 298 and slides lengthwise on the outside of the cylinder 299. Formed integral with the block 303 there is a stud 306 having a ball 307 at the end. This ball is connected to a drag link 308. This drag link has a head 309 with a spherical bearing surface 310. A sleeve 311 is securely attached to the head 309 and a plug 312 having a complementary swivel surface is threaded and attached at the outer end of the sleeve 311. This sleeve has an opening 313 on one side to allow assembly of the ball 307 in the sleeve and to accommodate the stud 306.

The manner of operation and functioning of the actuator of Figs. 8 and 9 is substantially as follows: When a hydraulic pressure is developed in either end of the cylinder 291 through the medium of fluid under pressure and entering at either of the connections 296 and 297, a positive pressure is exerted on one or other of the pistons 300 and its piston cup 301, thus forcing the piston rod 299 longitudinally in the cylinder. As the drag link 308 is positively connected to this piston rod and has a swivel connection, the drag link may be operated in the direction either parallel to the cylinder or at a relatively small angle thereto, or in fact the drag link 308 will be at substantially right angles to the cylinder 291, in which case the motion of the drag link would be mainly an angular motion. On account of the hydraulic fluid being forced out of the cylinder at the end opposite the fluid having the positive pressure, the piston 300 at the opposite end from the pressure end is maintained in contact with the piston rod 299. Thus by the internal pressure at both ends of the cylinder, the pistons form a contact with the piston rod 299 and thus eliminate a loose action of this form of actuator. It is to be understood that this type of actuator may be operated by the compressor shown in Fig. 1 or that shown in Fig. 3, and the assembly includes the combination reservoir and relief valve 41 and the shutoff valve 45.

My present invention may be considered an improvement and further development of my patent application Serial No. 672,539, for Hydraulic steering devices, filed May 24, 1933 which has become abandoned.

Various changes may be made in the details of my invention without departing from the spirit thereof as set forth in the accompanying claims.

I claim:

1. In a pulsator mechanism including a double ended compressor cylinder and one or more double ended motor cylinders, each having double ended pistons combined with a hydraulic connection between opposite ends of the compressor cylinder and opposite ends of each motor cylinder, said hydraulic connection including a combination reservoir and pressure relief valve provided with a movable plug, means to normally seat the plug to restrict flow from the reservoir to the compressor cylinder, means maintaining a pressure on fluid in the reservoir, said pressure means being adapted to unseat the plug to replenish fluid to the compressor cylinder and excess pressure in the compressor cylinder developing an additional pressure on the plug to maintain said plug in the closed position, a manually adjustable control valve mounted in the plug and adapted to permit a slow passage of fluid from the compressor to the reservoir to transfer flu'd on expansion in the compressor to the reservoir.

2. In a pulsator mechanism as claimed in claim 1, the hydraulic connection between the compressor and the motor cylinders including a control valve, said valve having a housing with a pair of ducts therethrough, connections from one end of said ducts to the compressor cylinder and from the opposite end of said ducts to the motor cylinders, a rotatable stem in the housing having a transverse port, the housing having a transverse duct leading from the pair of ducts and adapted to register with the port of the valve, the said stem being rotatable to disalign the port of the valve and the said transverse duct or to align therewith, the said port when aligned with the transverse ducts giving a communication between opposite ends of the compressor and motor cylinders, said port when disaligned with the transverse duct directing the hydraulic fluid between the ends of the compressor cylinder and the ends of the motor cylinder.

3. In a device as described, a compressor having a double-ended cylinder, a piston rod and pistons therein, means to reciprocate the piston rod and hence the pistons, an actuator having a double-ended cylinder, a piston rod with pistons therein, a hydraulic connection between the ends of the compressor and actuator cylinders, said connection having a combination reservoir and pressure relief valve including a movable plug adapted to seat on excess pressure from the compressor and prevent entrance of fluid into the reservoir and a manually adjustable control valve to always permit slow passage of fluid to and from the reservoir in accordance wtih differential pressures between the reservoir and compressor, the reservoir having means to exert a pressure on the fluid therein to unseat the plug and supply a deficiency of fluid to the compressor, the actuator having means operative on a reciprocating motion of its piston rod to develop a rotational movement between at least part of the cylinder, and a structure engaging the piston rod of the actuator.

4. In a pulsator mechanism including a double-ended compressor cylinder and a double-ended motor cylinder each having double-ended pistons combined with a hydraulic connection between opposite ends of the compressor and motor cylinders including a combination reservoir and pressure relief valve provided with a movable plug adapted to seat on excess pressure from the compressor and prevent entrance of fluid into the reservoir, means constantly developing a pressure on the fluid of the reservoir to replenish a deficiency in the compressor and a manually adjustable control valve to always permit a slow passage of fluid in either direction between the compressor and the reservoir dependent on the differential pressures in the reservoir and compressor to transfer fluid on expansion in the compressor to the reservoir.

CHARLES U. BALLARD.